(12) United States Patent
Da Silva et al.

(10) Patent No.: US 6,950,185 B1
(45) Date of Patent: Sep. 27, 2005

(54) SPECTROMETRIC IMAGING APPARATUS

(75) Inventors: Edouard Da Silva, Lille (FR); Michel DelHaye, Villeneuve d'Ascq (FR); Michel Leclercq, Bois le Roi (FR); Bernard Roussel, Valenciennes (FR)

(73) Assignee: Jobin Yvon S.A., Longjumeau (FR)

( * ) Notice: Subject to any disclaimer, the term of this patent is extended or adjusted under 35 U.S.C. 154(b) by 29 days.

(21) Appl. No.: 10/048,972

(22) PCT Filed: Aug. 8, 2000

(86) PCT No.: PCT/FR00/02278
§ 371 (c)(1),
(2), (4) Date: May 3, 2002

(87) PCT Pub. No.: WO01/13157
PCT Pub. Date: Feb. 22, 2001

(30) Foreign Application Priority Data

Aug. 11, 1999 (FR) .................................. 99 10406

(51) Int. Cl.[7] .............................................. G01J 3/28
(52) U.S. Cl. ..................................................... 356/326
(58) Field of Search ............................. 356/326, 328, 356/300–303, 305, 319, 320; 359/368, 372, 359/379, 384, 389, 388, 385

(56) References Cited

U.S. PATENT DOCUMENTS

| 4,523,799 | A | | 6/1985 | Delhaye et al. |
| 4,997,242 | A | * | 3/1991 | Amos .......................... 359/202 |
| 5,192,980 | A | | 3/1993 | Dixon et al. |
| 5,532,873 | A | * | 7/1996 | Dixon .......................... 359/388 |
| 5,822,061 | A | * | 10/1998 | Delhaye et al. ............. 356/326 |
| 5,892,569 | A | * | 4/1999 | Van de Velde ............. 351/221 |
| 6,134,002 | A | * | 10/2000 | Stimson et al. ............. 356/326 |
| 6,488,892 | B1 | * | 12/2002 | Burton et al. ............ 422/82.05 |
| 2005/0073742 | A1 | * | 4/2005 | Weyh et al. ................ 359/385 |

FOREIGN PATENT DOCUMENTS

| EP | 0502752 A1 | 9/1992 |
| FR | 2754341 | 4/1998 |

* cited by examiner

*Primary Examiner*—Zandra V. Smith
*Assistant Examiner*—Gordon J. Stock, Jr.
(74) *Attorney, Agent, or Firm*—Arent Fox PLLC

(57) ABSTRACT

An inelastic diffusion spectrometric imaging apparatus includes an illuminating and energising system including a confocal first aperture and a second confocal aperture combined with the first. A first deflector assembly scanning for scanning a sample and a second deflector assembly sychronised with the first, are placed respectively downstream and upstream of the second confocal aperture and a spectrometer. The input aperture of the spectrometer merges with the second confocal aperture.

10 Claims, 3 Drawing Sheets

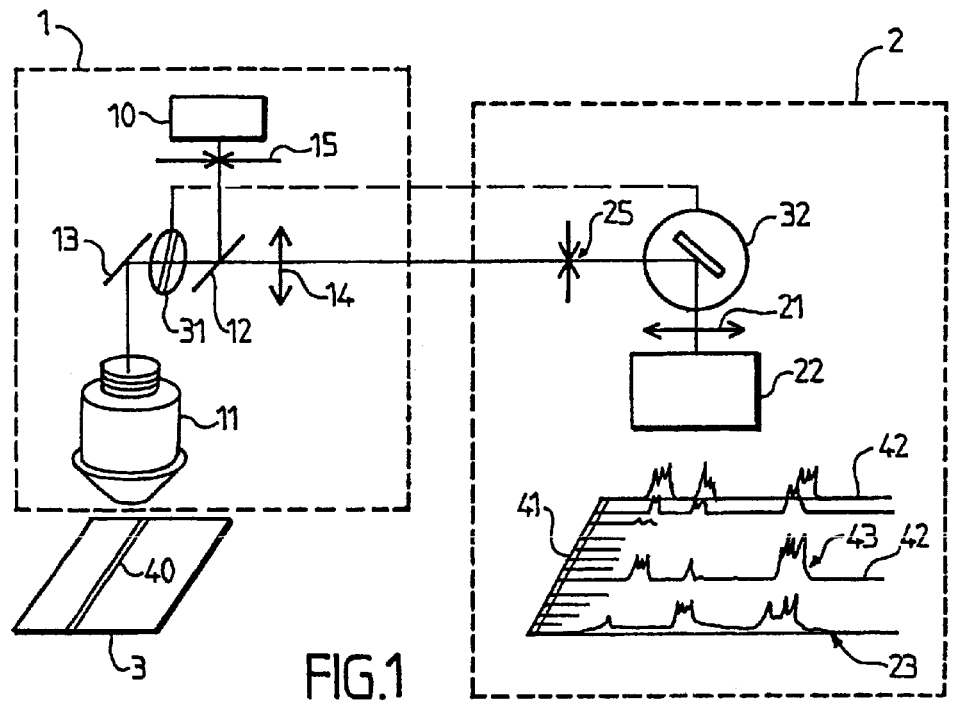
FIG.1
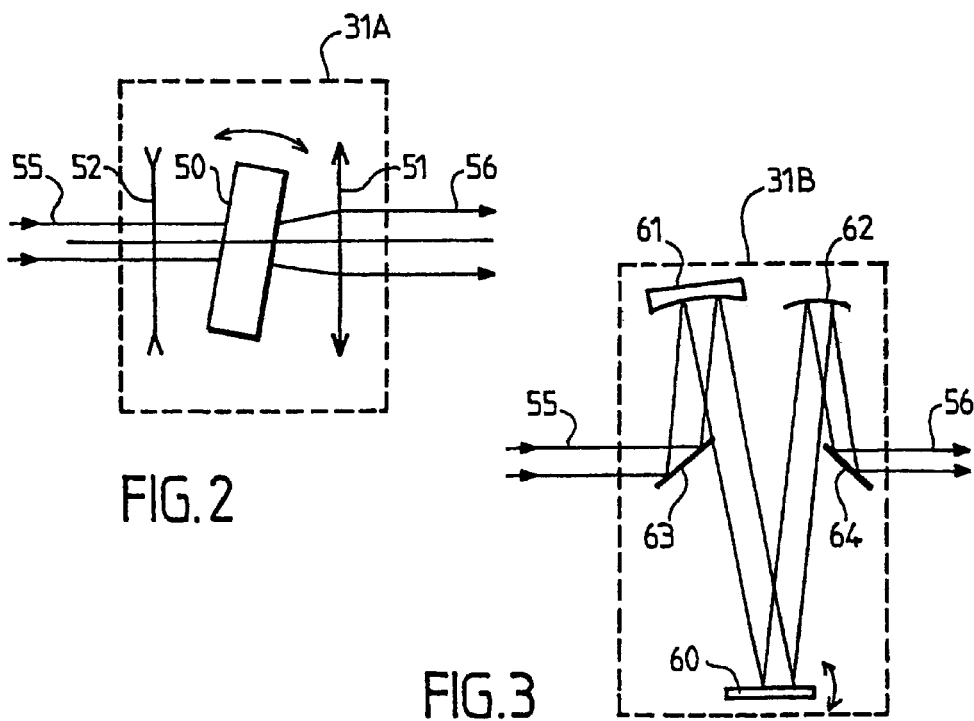
FIG.2
FIG.3

SPECTROMETRIC IMAGING APPARATUS

CROSS-REFERENCE TO RELATED APPLICATION

This application is a National Stage entry of International Application No. PCT/FR00/02278, filed Aug. 8, 2000, the entire specification claims and drawings of which are incorporated herewith by reference.

This invention relates to a spectrometric imaging apparatus, especially of Raman or of low level fluorescence type.

The patent application EP-A1-0.502.752, in the name of the applicant company, discloses a confocal scanning spectrometry device comprising:
an assembly comprising:
an illuminating and energizing system including a first confocal aperture,
an optical system,
a second confocal aperture combined with the first, and
a first and a second synchronized deflector assemblies, placed respectively downstream and upstream of the second confocal aperture, and
a spectrometer comprising:
an input slot,
a spectral disperser, and
a two-dimensional multichannel detector.

Such a realisation enables to reduce the analysis time of a sample considerably with respect to conventional confocal spectrometry devices. Line scanning of the object can be performed in that the light beam scans the input slot of the spectrometer. The device of that previous application also offers an enlargement factor, due to the use of two synchronous deflectors, which enables to change the dimension of an image scanned in an object space, from the maximum dimension covered by the lens of the confocal microscopy assembly down to a very small dimension which is solely limited by the detectable energy threshold.

The content of that previous application EP-A1-0.502.752 must be considered as part of this application, for all matters pertaining to the realisation mentioned above.

The present invention relates to a spectrometry imaging apparatus enabling to extend the usage of the device known by the previous application to the whole spectral field useful to Raman spectroscopy and liable to be more readily employable than the previous device.

To that end, the invention concerns a spectrometric imaging apparatus comprising:
a confocal microscopy assembly comprising:
an illuminating and energizing system including a first confocal aperture,
an optical system,
a second confocal aperture combined with the firsts and
a first deflector assembly, capable of scanning lines on a sample and a second deflector assembly, both synchronized, placed respectively downstream and upstream of the second confocal aperture, illuminating
a spectrometer comprising:
a spectral disperser, and
a two-dimensional multichannel detector.

According to the invention, the spectrometer comprises an input aperture combined with the second confocal aperture.

The second deflector assembly is thus arranged downstream of the input to the spectrometer. This input is a confocal aperture.

The first and the second confocal apertures are preferably composed of adjustable holes, obtained by means such as transmission or reflection diaphragms. They are approximately circular and of small dimensions.

With respect to the known device, described in the application EP-A1-0.502.752, the imager of the invention simplifies the assembly while reducing the number of optical parts, which is an important advantage in particular in the ultraviolet area, and while suppressing a separate confocal aperture.

Moreover, the spectrometric imaging apparatus according to the invention has the advantage of being integrated to a so-called infinite apparatus, involving parallel beams. Thus, the imaging elements of the invention can be inserted in the form of blocks in pre-existing devices comprising an infinite microscope and/or an infinite spectrometer.

Preferably, the spectrometric imaging apparatus of the invention is arranged for Raman spectroscopy or low level fluorescence spectroscopy.

The dispersive spectrometer is preferably stigmatic, i.e. it produces for each point of the input aperture, a spectral image covering a line of pixels of a bi-dimensional multichannel detector.

Preferably, the first deflector assembly comprises substantially a-focal optics and is placed on a parallel beam.

Thus, this first deflector assembly does not induce any signal losses. It enables:
to deflect a beam as well as
to carry pupils over.

The first deflector assembly can be of the refractive or reflective type (i.e. operating respectively in refraction or in reflection).

According to a first preferred embodiment of a-focal optics, the latter comprise a converging lens, a diverging lens and a first refractive deflector placed between these lenses.

In a second preferred embodiment of a-focal optics, the latter comprise mirrors and a first reflection deflector capable of receiving a parallel beam from one of these mirrors and of reflecting this parallel beam towards another mirror.

The mirrors comprise advantageously spherical mirrors.

In a peculiar embodiment, the first deflector assembly comprises a first deflector which, by means of optical elements, is arranged for two dimension scanning on a sample. Notably, in combination with the first or the second preferred embodiments of the a-focal optics, the first deflector is then capable of scanning frames on one sample, in a direction perpendicular to the lines.

In another embodiment, obtained from the first or the second preferred embodiments of the a-focal optics:
the first deflector assembly comprises translation means for the lenses or for the mirrors, enabling to scan this line in a direction perpendicular to that line.

Thus two sub-forms of both first embodiments of the a-focal optics can be distinguished:
either the first deflector scans frames perpendicular to these lines,
or the first deflector scans a line and the associated elements in the a-focal optics scan at right angle to that line; the deflection obtained by these elements, so-called frame-deflection, is then much slower than that produced by the first deflector; called line deflection (the line deflection frequency is a multiple integer of the frame deflection frequency).

The arrangement with means for translating the lenses or mirrors enables simplification of the system while reducing the number of components.

In an embodiment variation, the first deflector is capable of scanning a line on a sample, for example by the rotation of an optical element, and it is itself mounted on a mobile device, enabling to move this line, on the object, in a direction perpendicular to this line (frame scanning).

It is interesting that the first deflector assembly also generates a scanning along a third dimension, parallel to the beam (in-depth analysis of the sample) thus enabling the production of three-dimensional special confocal images.

The second deflector assembly, placed in the spectrometer, produces a deviation making up a line deflection (perpendicular to the grid lines formed on the multichannel detector), which is synchronous with that realised by the first deflector assembly. This second deflector assembly is preferably reflective. It thus enables to reduce spurious light effects. In an embodiment variation, the second deflector assembly is refractive.

Preferably, the first and second deflector assemblies produce synchronous deflections with variable amplitudes allowing the changing of the enlargement factor.

Advantageously, controlled displacement along the axis of the microscope enables to generate three-dimensional spectral confocal images.

In a first preferred arrangement of the second deflector assembly, the said assembly is placed between the input aperture of the spectrometer and the multichannel detector.

Thus, in an embodiment of this first arrangement, the spectrometer comprises a first lens or collimator and the second deflector assembly is placed between the input aperture and this first lens. This embodiment is easy to implement.

In another variation of this embodiment, the spectrometer comprises a first spherical mirror upstream of the spectral disperser and the second deflector assembly is placed between the input aperture and this spherical mirror.

In an arrangement of the second deflector assembly, the said assembly is placed between the spectral disperser and the multichannel detector.

In a second arrangement of the second deflector assembly, the said assembly comprises at least a portion of the spectral disperser itself Reflection can then be obtained by oscillation of the spectral disperser or of one of its optical elements or by a device combined with the said disperser.

According to a third arrangement of the second deflector assembly, the said assembly consists of the multichannel detector. The second deflector assembly uses then the charge transfer on a charge-coupled device of the multichannel detector. It is provided advantageously that the detector should have a sequential control and that the first deflector assembly has a 'stepping' control, in order to obtain synchronisation of both deflector assemblies easily.

According to an advantageous embodiment, the imager comprises an optical fibre placed between the first and the second synchronous deflector assemblies, coupled to the input aperture of the spectrometer and intended for remote transport of the information enabling to build a confocal space image.

Thus, the second confocal aperture can be projected onto the optical fibre that carries the information. The scanning phase should then be transported or controlled in order to ensure synchronisation of the deflectors.

The invention will be better understood and illustrated using non limitative examples with reference to the appended drawings on which:

FIG. 1 represents a general diagram of a first embodiment of a spectrometric imaging apparatus according to the invention and its use;

FIG. 2 illustrates a first embodiment of the first deflector assembly of the imager of FIG. 1;

FIG. 3 illustrates a second reflective embodiment of the first deflector assembly of the imager of FIG. 1;

Figure 4:
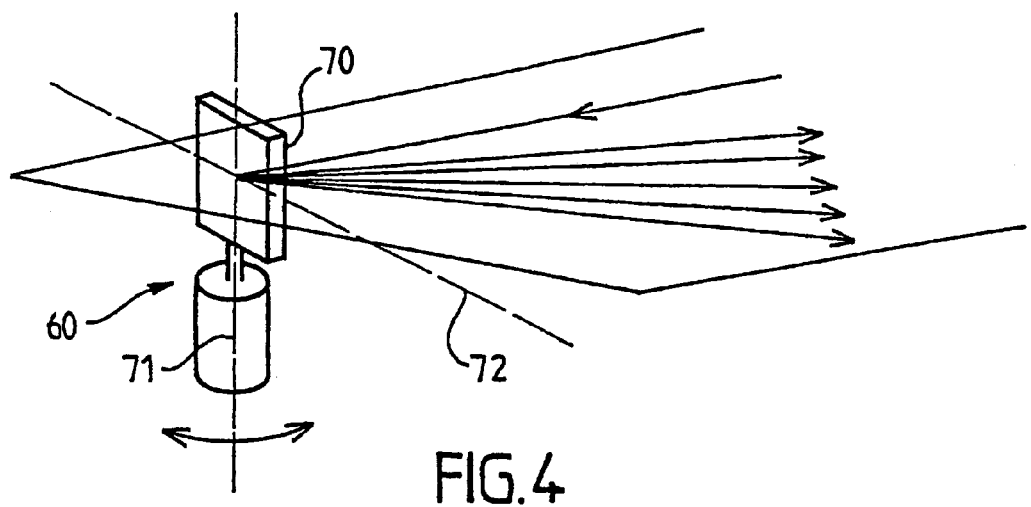
FIG. 4 is a simplified perspective representation of the deflector of the first deflector assembly of FIG. 3.

A spectrometric imaging apparatus according to the invention comprises a microscopic illuminating system 1 and a spectrometer 2. The microscopic illuminating system 1 comprises an energising source such as a laser 10 associated with a first confocal aperture, such as a size- and position-adjustable hole. The system 1 also contains a microscope lens 11, towards which is directed a laser beam emitted by the laser 10 after space filtering by the aperture 15, reflection on a partially reflecting separator 12 and reflection on a plane mirror 13. The system 1 also comprises a first deflector assembly 31, enabling to scan a sample 3 along one, two or three dimensions.

The system 1 also has a second optical system guiding a beam emitted by the sample 3, collected by the microscope lens 11 and transmitted by the separator 12, to the spectrometer 2. This second optical system comprises, for example, converging optics 14.

The spectrometer 2 is a multichannel spectrometer fitted with a bidimensional detector 23. Most often, the bidimensional detector is associated with processing means that collect the signals produced by the detector in real time and that may give a representation thereof either in real time or in delayed time. In the text below, we shall designate generally by the term detector the photoelectric converter itself and the associated processing means. The spectrometer comprises an input aperture 25, which forms a second confocal aperture combined with the first confocal aperture 15. A confocal aperture refers to a small hole, substantially circular, formed in a cache. The second confocal aperture 25 plays therefore in the spectrometer the usual part of a slot in the grid spectrometers.

The spectrometer also comprises a first optical system 21 or collimator and a spectral dispenser 22, in the form of a diffraction grid. Such diffraction grid is formed of lines parallel to each other. A parallel light beam incident on the grid is dispersed on the dispersion plane that is perpendicular to the lines of the grid. The spectrometer is fitted with a second deflector assembly 32, arranged in the example represented between the input aperture 25 and the optics 21.

In operation, a laser beam emitted by the laser 10 and deviated by the deflector assembly 31 is sent towards the sample 3. This beam scans a line 40 of the sample 3. The light Raman flux diffused in succession by each point of this line 40 of the sample is collected by the lens of the microscope 11 and focused, after passing through the first deflector assembly 31, into an input point of the spectral disperser 22.

The second deflector assembly 32, synchronised with the first produces a scanning parallel to the lines of the grid and addresses the light spectrum 43 generated from each point of the line 40 scanned on a line of the detector 23.

We can thus obtain on the detector 23 vertically, for example, the spatial distribution of the line 40 (line 41) and horizontally, the spectral data 43 (line 42).

The second deflector assembly 32 is in practice adjusted so that its deflection on the detector 23 corresponds to the vertical dimension of the said detector and that the first deflector assembly 31, synchronous with the deflector assembly 32, is adjusted between zero and a maximum value limited by the field of the lens (whereas the zero value corresponds to the analysis of a point).

The first deflector assembly 31 comprises a-focal optics. In a first embodiment of this a-focal optics (FIG. 2), the first deflector assembly referred as 31A comprises a refractive deflector 50 placed between a converging lens 51 and a diverging lens 52. The lenses 51 and 52 have respectively focal distances close to one another. The first deflector assembly 31A is such that an incident parallel beam 55 comes out in the form of a deviated quasi-parallel beam 56. In this embodiment, the lenses 51 and 52 are fixed and the deflector 50 produces the deflections requested.

In a second embodiment of the first deflector assembly 31, referred 31B (FIG. 3), the said deflector comprises a reflective deflector 60 and two spherical mirrors 61 and 62, arranged for example respectively upstream and downstream of the deflector 60. The deflector 31B may also comprise two plane mirrors 63 and 64 arranged respectively upstream and downstream of the spherical mirrors 61 and 62. The whole forms a-focal optics in association with the deflector 60 and thus provides a parallel beam 56 from a parallel beam 55 at input.

The mirrors 61–64 are fixed, while the deflector 60 performs the requested scanning cycle(s).

Figure 5:
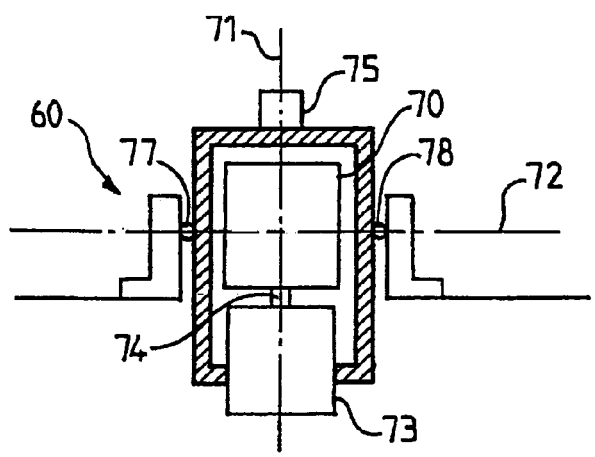
FIG. 5 is a front representation of the deflector of the first deflector assembly of FIG. 3.
Figure 6:
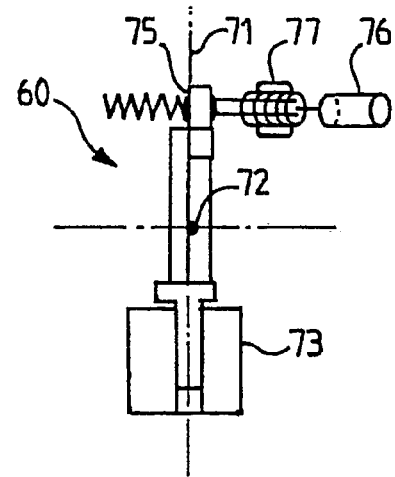
FIG. 6 is a lateral view of the deflector of the first deflector assembly of FIG. 3.

Preferably, the deflector 60, which comprises for instance, a plane mirror 70, is mobile in rotation around a first axis 71, enabling frame scanning (i.e. parallel to the lines of the refraction grid on the multichannel deflector 23) and around a second axis 72, enabling line scanning (i.e. scanning perpendicular to the lines of the diffraction grid on the multichannel detector 23) (see FIG. 4). In an embodiment of this deflector 60 (FIGS. 5 and 6), the said deflector comprises a motor 73 actuating into rotation the mirror 70 around the axis 71 via a shaft 74, and a second motor 76 actuating the mirror 70 into rotation around the second axis 72, for example using balls 77 and 78 arranged laterally with respect to the mirror 70, and an elastic recall device acting as a part 75 arranged above the mirror 70. This motor 76 is then preferably a stepping motor.

When the first deflector scans the object in two dimensions, the second deflector is always synchronised on the scanning of this object in a direction, for example the line scanning. The detector then generates in succession the spectral information from the different lines. These pieces of information are captured by an associated processing unit that is capable of presenting the information of the spectrum diffused by the points of both dimensions of the sample in any requested format. It can be understood that any means enabling to scan the object in three dimensions can be processed in a similar fashion. The scanning of the transversal plane has been described as a line and frame process, which is preferable, but any scanning of the complete plane enables to realise an image.

Figure 7:
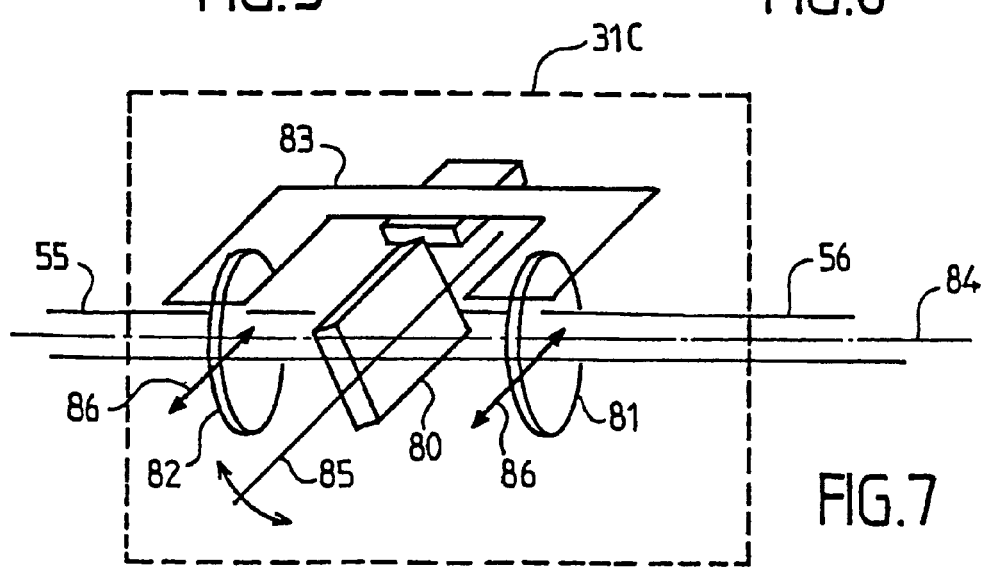
FIG. 7 shows a third embodiment of the first deflector assembly of the apparatus of FIG. 1

In a third embodiment of the first deflector assembly 31, referred 31C (FIG. 7), the said assembly comprises a refractive deflector 80 placed between two lenses 81 and 82, respectively converging and diverging. The lenses 81 and 82 and the deflector 80 being aligned along an axis 84, the deflector 80 is mobile in rotation around a rotational axis 85 perpendicular to the axis of alignment 84, in order to allow line scanning. Moreover, the first deflector assembly 31C comprises translation means 83 for the lenses 81 and 82 along a direction 86 parallel to the axis of rotation 85, for frame scanning, which is much slower than the line scanning (the line deflection frequency is a multiple integer of the frame deflection frequency). This first deflector assembly 31C thus forms a compact a-focal system comprising a reduced number of components, and providing a parallel beam 56 from an incident parallel beam 55.

In a fourth embodiment of the first deflector assembly (not represented), the second embodiment 31B of the first deflector assembly is adapted in a similar fashion, while making the spherical mirrors 61 and 62 mobile, which enables to limit the deflection movements of the deflector 60 to line scanning only.

Figure 8:
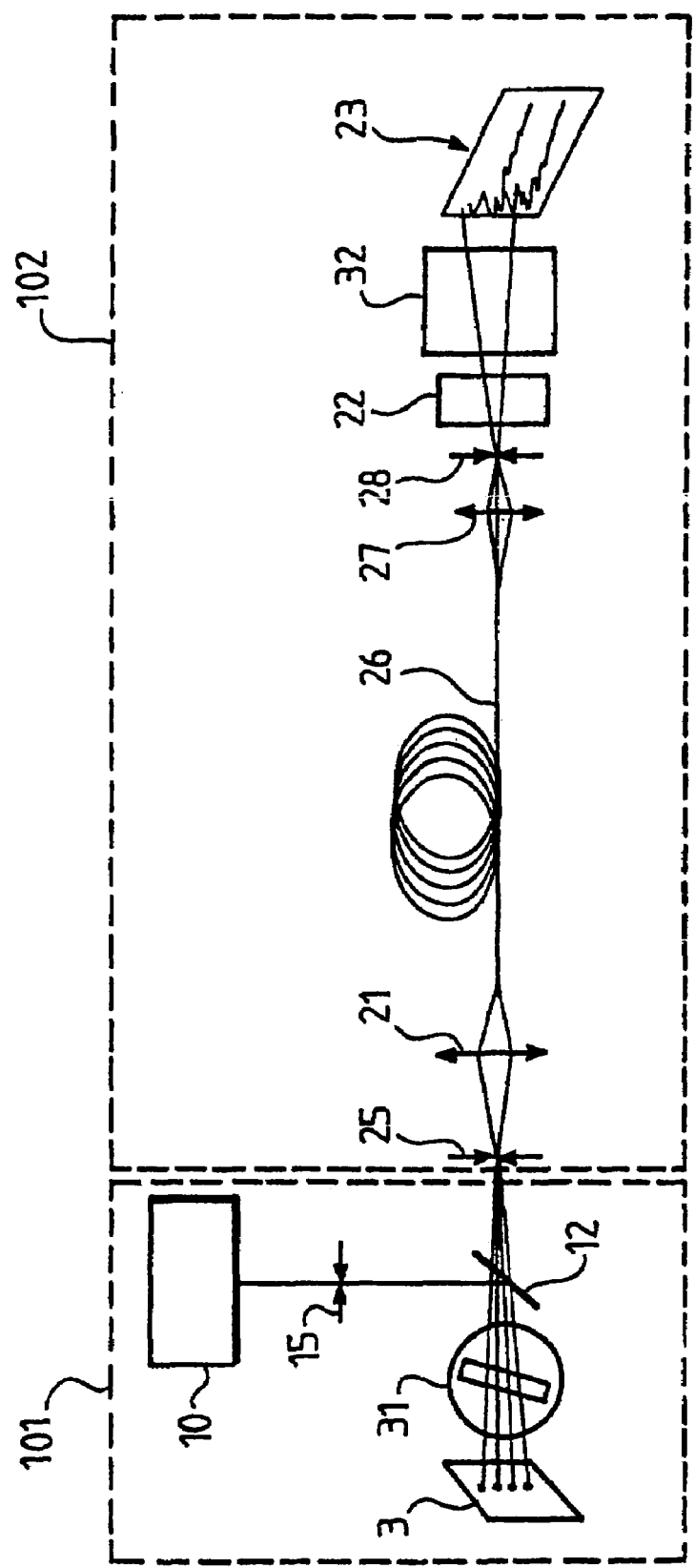
FIG. 8 illustrates a second embodiment of a spectrometric imaging apparatus according to the invention.

In a second embodiment of the spectrometric imaging apparatus (FIG. 8), identical or similar elements being designated by the same references, this apparatus comprises a confocal microscopy system 101 and a spectrometer 102. The spectrometer 102 comprises, besides the input aperture 25, the collimator 21, the spectral disperser 22 and the multichannel detector 23, an optical fibre 26 coupling the collimator 21 to a second lens 27 at the output of the optical fibre 26, a diaphragm 28 and the second deflector assembly 32, arranged between the spectral disperser 22 and the detector 23.

Thus, the optical fibre, placed between the first and second deflector assemblies ensures remote transport of the information enabling to build a confocal spectral image.

The second deflector assembly 32, synchronous with the first deflector assembly 31, is placed downstream of the input aperture 25. In certain embodiment variations, it is situated between the input aperture 25 and the disperser 22, on the disperser 22 or combined with the said, between the disperser 22 and the detector 23 or on the detector 23 or combined with the said.

Particularly advantageous embodiments are given by the following combinations. In the cases when the second deflector assembly 32 is placed between the input aperture 25 and the disperser 22 or on the disperser 22 or still between the disperser 22 and the detector 23 or on the detector 23, we choose generally the first embodiment of the imager (FIG. 1), which enables to work on a beam smaller than the second embodiment (FIG. 8) and we use preferably reflection operating deflectors (FIGS. 3 to 6).

In case when the second deflector assembly 32 is combined with the disperser 22, we use preferably mechanic or piezoelectric deflectors. Indeed, the angular deflection is then small.

What is claimed is:

1. A spectrometric imaging apparatus, comprising:
   a microscopic illuminating assembly, comprising:
   an energizing source;
   a first confocal aperture;
   an optical system; and
   a first deflector assembly configured to scan lines on a sample; and a spectrometer, comprising:
   a second confocal aperture which forms an input aperture of the spectrometer, wherein the second confocal aperture is coupled to the first confocal aperture;
   a second deflector assembly, wherein the first deflector assembly and the second deflector assembly are synchronized, the first deflector assembly is positioned upstream of the second confocal aperture, and the second deflector assembly is positioned downstream of the second confocal aperture;

a spectral disperser; and a two-dimensional multichannel detector, wherein the microscopic illuminating assembly is configured to illuminate the spectrometer.

2. The spectrometric imaging apparatus of claim 1, wherein the first deflector assembly is configured to scan frames on the sample in a direction which is perpendicular to the said lines.

3. The spectrometric imaging apparatus of claim 1, wherein the first and second deflector assemblies produce synchronous deflections with variable amplitudes allowing a changing in an enlargement factor; the enlargement factor being created by the use of two synchronous deflectors, wherein the enlargement factor allows for a change of at least one dimension of an image scanned in an object space.

4. The spectrometric imaging apparatus of claim 1, wherein the second deflector assembly is positioned between the second confocal aperture and the multichannel detector.

5. The spectrometric imaging apparatus of claim 1, further comprising an optical fiber positioned between the first and the second deflector assemblies and coupled to the second confocal aperture and configured to allow for remote transport of information that allows for a generation of a confocal spatial image.

6. The spectrometric imaging apparatus of claim 1, wherein the first deflector assembly comprises substantially a-focal optics and is positioned on a parallel beam.

7. The spectrometric imaging apparatus of claim 6, wherein the a-focal optics comprises a converging lens, a diverging lens, and a first refraction deflector positioned between the converging lens and the diverging lens.

8. The spectrometric imaging apparatus of claim 6, wherein the a-focal optics comprises a first mirror; a second mirror; and a reflection deflector configured to receive the parallel beam from the first mirror and to reflect the parallel beam toward the second mirror.

9. The spectrometric imaging apparatus of claim 7, wherein the first deflector assembly comprises translation means for the converging lens and the diverging lens, wherein the translation means allows the first deflector assembly to scan the lines in a direction which is perpendicular to the lines.

10. The spectrometric imaging apparatus of claim 8, wherein the first deflector assembly comprises translation means for the first mirror and the second mirror, wherein the translation means allows the first deflector assembly to scan the lines in a direction which is perpendicular to the lines.

* * * * *